(12) United States Patent
Semenuk

(10) Patent No.: US 10,576,574 B2
(45) Date of Patent: Mar. 3, 2020

(54) CAGE FOR LABORATORY ANIMAL

(71) Applicant: Michael Semenuk, Millersville, MD (US)

(72) Inventor: Michael Semenuk, Millersville, MD (US)

( * ) Notice: Subject to any disclaimer, the term of this patent is extended or adjusted under 35 U.S.C. 154(b) by 1024 days.

(21) Appl. No.: 14/416,836

(22) PCT Filed: Jul. 10, 2013

(86) PCT No.: PCT/US2013/049920
§ 371 (c)(1),
(2) Date: Jan. 23, 2015

(87) PCT Pub. No.: WO2014/018265
PCT Pub. Date: Jan. 30, 2014

(65) Prior Publication Data
US 2015/0201581 A1 Jul. 23, 2015

Related U.S. Application Data

(60) Provisional application No. 61/674,722, filed on Jul. 23, 2012.

(51) Int. Cl.
| | |
|---|---|
| *A01K 1/03* | (2006.01) |
| *B23K 9/10* | (2006.01) |
| *A01K 1/00* | (2006.01) |
| *A01K 1/035* | (2006.01) |
| *H02M 1/42* | (2007.01) |

(52) U.S. Cl.
CPC .......... *B23K 9/1075* (2013.01); *A01K 1/0047* (2013.01); *A01K 1/031* (2013.01); *A01K 1/0356* (2013.01); *B23K 9/1006* (2013.01); *H02M 1/4225* (2013.01)

(58) Field of Classification Search
CPC ........ A01K 1/03; A01K 1/031; A01K 1/0047; A01K 1/0356
See application file for complete search history.

(56) References Cited

U.S. PATENT DOCUMENTS

| | | | | |
|---|---|---|---|---|
| 2,467,525 | A | | 4/1949 | Fricke |
| 3,063,413 | A | | 11/1962 | Fuller et al. |
| 3,212,474 | A | * | 10/1965 | Higgins ................ A01K 1/031 119/475 |
| 3,397,676 | A | * | 8/1968 | Barney ................ A01K 1/031 119/417 |
| 3,456,618 | A | * | 7/1969 | Barlow ................ A01K 1/031 119/456 |
| 3,464,388 | A | * | 9/1969 | Stout ..................... A01K 1/031 119/418 |

(Continued)

OTHER PUBLICATIONS

International Search Report for corresponding International Application No. PCT/US2013/049920, dated Oct. 15, 2014.

*Primary Examiner* — Monica L Williams
*Assistant Examiner* — Michael A. Fabula
(74) *Attorney, Agent, or Firm* — Hauptman Ham, LLP

(57) ABSTRACT

An animal cage includes a removable, suspended interior floor provided with a plurality of perforations formed therein. The floor creates a plenum inside the cage allowing air to flow laminarly through the perforations and liquids or liquid waste to substantially fall through the perforations in the raised floor.

20 Claims, 13 Drawing Sheets

(56) References Cited

U.S. PATENT DOCUMENTS

| | | | | |
|---|---|---|---|---|
| 3,752,123 A * | 8/1973 | Classe | A01K 1/03 | 119/480 |
| 3,897,751 A * | 8/1975 | Gullino | A01K 1/031 | 119/420 |
| 3,924,571 A * | 12/1975 | Holman | A01K 1/031 | 119/419 |
| 3,990,398 A * | 11/1976 | Davis, Jr. | A01K 1/031 | 119/480 |
| 4,085,705 A | 4/1978 | Gland et al. | | |
| 4,154,196 A | 5/1979 | Gass | | |
| 4,201,153 A | 5/1980 | Nace | | |
| 4,249,482 A * | 2/1981 | Harr | A01K 1/031 | 119/419 |
| 4,365,590 A * | 12/1982 | Ruggieri | A01K 1/031 | 119/418 |
| 4,402,280 A | 9/1983 | Thomas | | |
| 4,435,194 A | 3/1984 | Picard et al. | | |
| 4,480,587 A * | 11/1984 | Sedlacek | A01K 1/031 | 119/419 |
| 4,524,721 A * | 6/1985 | Lanner | A01K 1/0356 | 119/417 |
| 4,526,133 A | 7/1985 | LoMaglio | | |
| 4,528,941 A | 7/1985 | Spengler | | |
| RE32,113 E * | 4/1986 | Harr | A01K 1/031 | 119/419 |
| 4,593,650 A * | 6/1986 | Lattuada | A01K 1/031 | 119/419 |
| 4,690,100 A * | 9/1987 | Thomas | A01K 1/031 | 119/419 |
| 4,699,088 A * | 10/1987 | Murray | A01K 1/0356 | 119/419 |
| 4,798,171 A | 1/1989 | Peters et al. | | |
| 4,844,018 A | 7/1989 | Niki | | |
| 4,869,206 A | 9/1989 | Spina | | |
| 4,940,017 A | 7/1990 | Niki et al. | | |
| 4,989,545 A | 2/1991 | Sheaffer et al. | | |
| 5,003,922 A | 4/1991 | Niki et al. | | |
| 5,044,316 A * | 9/1991 | Thomas | A01K 1/031 | 119/419 |
| 5,048,459 A | 9/1991 | Niki et al. | | |
| 5,148,766 A | 9/1992 | Coiro, Sr. et al. | | |
| 5,171,690 A * | 12/1992 | Ylosjoki | A47K 11/02 | 435/290.1 |
| 5,307,757 A | 5/1994 | Coiro, Sr. et al. | | |
| 5,311,836 A * | 5/1994 | Sheaffer | A01K 1/031 | 119/419 |
| 5,320,064 A * | 6/1994 | Selstad | A01K 1/031 | 119/472 |
| 5,331,920 A * | 7/1994 | Coiro, Sr. | A01K 1/031 | 119/418 |
| 5,337,696 A * | 8/1994 | Edstrom | A01K 1/03 | 119/456 |
| D351,259 S * | 10/1994 | Semenuk | D30/119 | |
| 5,385,118 A * | 1/1995 | Coiro, Sr. | A01K 1/031 | 119/417 |
| 5,400,744 A * | 3/1995 | Coiro, Sr. | A01K 1/031 | 119/417 |
| 5,660,145 A * | 8/1997 | Rumbaugh | A01K 31/16 | 119/440 |
| D383,253 S * | 9/1997 | Semenuk | D30/120 | |
| 5,865,144 A * | 2/1999 | Semenuk | A01K 1/031 | 119/456 |
| 5,924,384 A * | 7/1999 | Deitrich | A01K 1/0356 | 119/416 |
| 6,092,487 A * | 7/2000 | Niki | A01K 1/031 | 119/420 |
| 6,138,610 A * | 10/2000 | Niki | A01K 1/031 | 119/418 |
| 6,257,171 B1 * | 7/2001 | Rivard | A01K 1/031 | 119/419 |
| 6,293,229 B1 * | 9/2001 | Edstrom, Sr. | A01K 1/031 | 119/458 |
| 6,308,660 B1 * | 10/2001 | Coiro, Sr. | A01K 1/031 | 119/419 |
| 6,457,437 B1 * | 10/2002 | Frasier | A01K 1/031 | 119/419 |
| 6,588,373 B1 * | 7/2003 | Strzempko | A01K 1/0245 | 119/416 |
| 6,612,260 B1 * | 9/2003 | Loyd | A01K 1/031 | 119/418 |
| 6,953,266 B1 * | 10/2005 | Ver Hage | A01K 1/031 | 119/452 |
| 7,252,050 B2 * | 8/2007 | Cole | A61M 16/10 | 119/416 |
| 7,497,187 B2 * | 3/2009 | Ingley, III | A01K 1/031 | 119/417 |
| 8,037,847 B2 * | 10/2011 | Malnati | A01K 1/031 | 119/418 |
| 8,156,899 B2 * | 4/2012 | Conger | A01K 1/031 | 119/416 |
| 9,155,283 B2 * | 10/2015 | Conger | A01K 1/031 | |
| 9,265,229 B2 * | 2/2016 | Conger | A01K 1/0356 | |
| 9,706,752 B2 * | 7/2017 | Conger | A01K 1/0356 | |
| 2004/0055542 A1 * | 3/2004 | Donohoe | A01K 1/0236 | 119/472 |
| 2005/0022750 A1 * | 2/2005 | Gabriel | A01K 1/031 | 119/456 |
| 2005/0066908 A1 * | 3/2005 | Park | A01K 1/031 | 119/419 |
| 2005/0092257 A1 * | 5/2005 | Uchiyama | A01K 1/031 | 119/455 |
| 2006/0011143 A1 * | 1/2006 | Drummond | A01K 1/031 | 119/420 |
| 2006/0236951 A1 * | 10/2006 | Gabriel | A01K 1/031 | 119/455 |
| 2006/0254528 A1 * | 11/2006 | Malnati | A01K 1/031 | 119/419 |
| 2007/0006815 A1 * | 1/2007 | Correa | A01K 1/0029 | 119/443 |
| 2007/0169715 A1 * | 7/2007 | Conger | A01K 1/031 | 119/417 |
| 2007/0175404 A1 * | 8/2007 | Conger | A01K 1/031 | 119/420 |
| 2007/0193527 A1 * | 8/2007 | Verhage | A01K 1/031 | 119/418 |
| 2008/0066688 A1 * | 3/2008 | Malnati | A01K 1/031 | 119/419 |
| 2008/0087229 A1 * | 4/2008 | Gabriel | A01K 1/031 | 119/417 |
| 2008/0134984 A1 * | 6/2008 | Conger | A01K 1/031 | 119/417 |
| 2008/0236506 A1 * | 10/2008 | Conger | A01K 1/031 | 119/417 |
| 2008/0236507 A1 * | 10/2008 | Conger | A01K 1/031 | 119/417 |
| 2009/0025646 A1 * | 1/2009 | Craft | A01K 31/007 | 119/437 |
| 2009/0090303 A1 * | 4/2009 | Osada | A01K 1/031 | 119/417 |
| 2010/0108622 A1 * | 5/2010 | Gabriel | A01K 1/031 | 211/4 |
| 2010/0116765 A1 * | 5/2010 | Gabriel | A01K 1/031 | 211/189 |
| 2010/0242852 A1 * | 9/2010 | Conger | A01K 1/031 | 119/419 |
| 2010/0282177 A1 * | 11/2010 | Rivard | A01K 1/031 | 119/417 |
| 2011/0041773 A1 * | 2/2011 | Brielmeier | A01K 1/031 | 119/419 |
| 2011/0061600 A1 * | 3/2011 | Conger | A01K 1/031 | 119/419 |
| 2011/0132272 A1 * | 6/2011 | Gabriel | A01K 1/031 | 119/456 |
| 2011/0239953 A1 * | 10/2011 | Tchekneva | A01K 1/031 | 119/417 |
| 2012/0085293 A1 * | 4/2012 | Owens | A01K 1/03 | 119/455 |

(56) References Cited

U.S. PATENT DOCUMENTS

| | | | |
|---|---|---|---|
| 2012/0272919 A1* | 11/2012 | McClelland | A01K 1/031 119/420 |
| 2014/0096719 A1* | 4/2014 | Klocke | A01K 1/0047 119/448 |
| 2014/0196666 A1* | 7/2014 | Kuzniar | A01K 1/0107 119/479 |
| 2014/0245966 A1* | 9/2014 | Oshima | A01K 1/031 119/472 |
| 2017/0339917 A1* | 11/2017 | Conger | A01K 1/0356 |

* cited by examiner

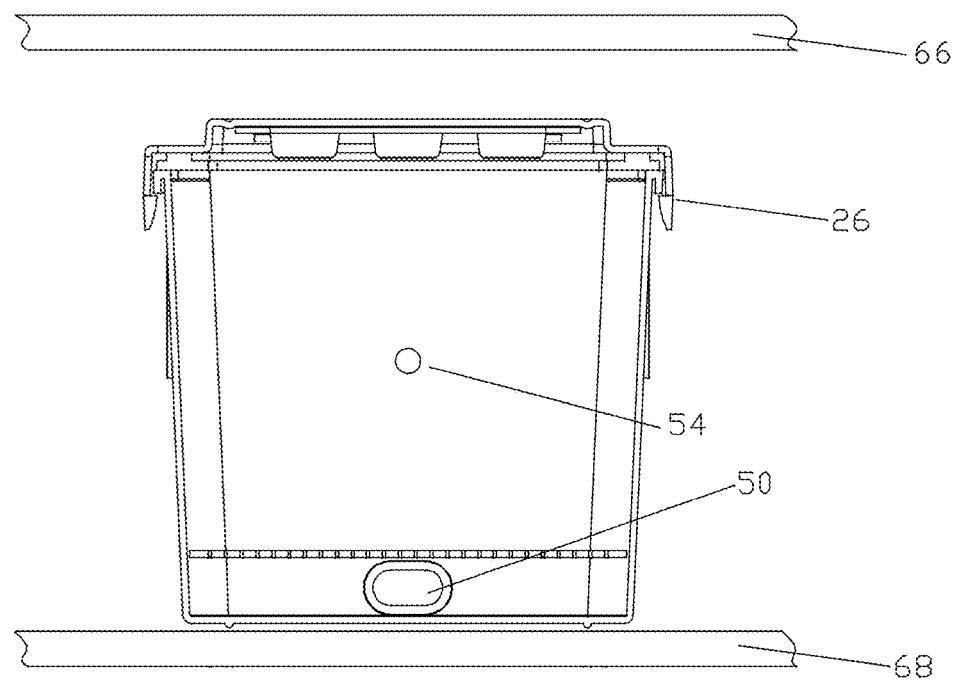

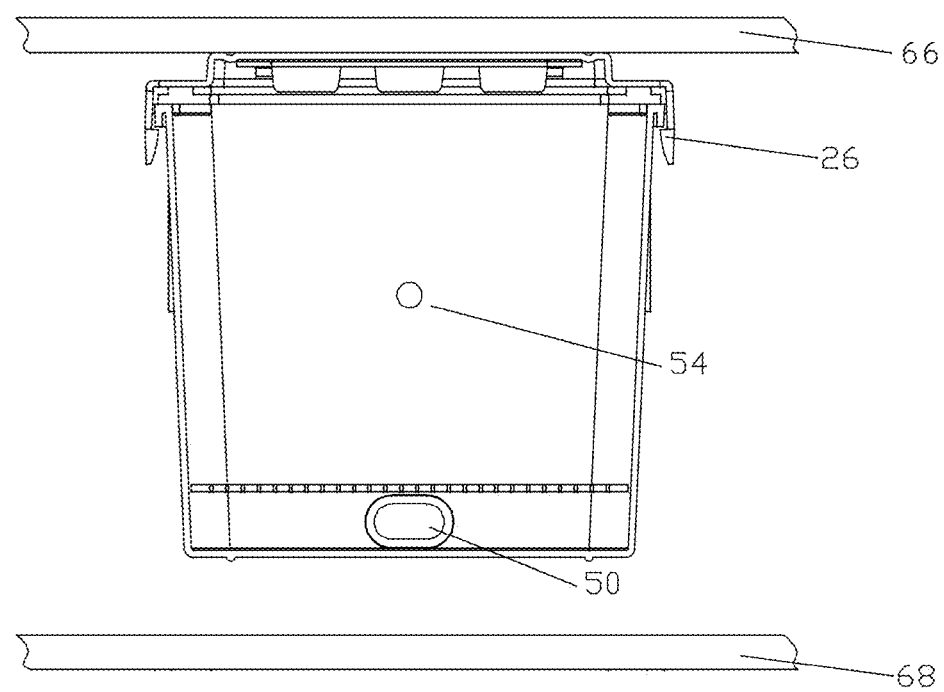

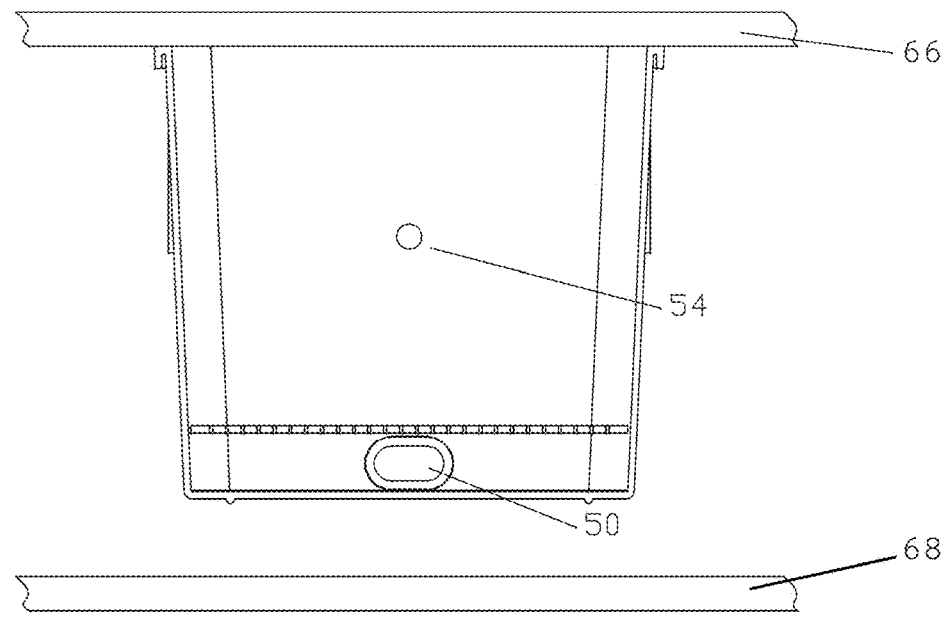

CAGE FOR LABORATORY ANIMAL

RELATED APPLICATIONS

The present application is based on, and claims priority from US Provisional Application Number 61/674,722, filed Jul. 23, 2012, and PCT Application Number PCT/US2013/049920, filed Jul. 10, 2013, the contents of which are hereby incorporated by reference herein in their entireties.

BACKGROUND OF THE INVENTION

The present invention relates to caging systems for laboratory animal care and more particularly to a cage and system which has controlled ventilation, waste containment and cage construction that will direct airflow through the bedding, thus keeping it dry which will reduce bacteria formation caused by humidity and moisture.

Most all existing ventilated rodent cage systems are made with plastic clear solid-bottom cages. Clear cages are used so it is possible to inspect the condition of the inside of the cage without disturbing the animals. The solid bottom of the cage compartment is used to hold bedding material. The cage ensemble generally consists of a metal wire bar lid containing a feed hopper and water bottle capabilities and a plastic top that holds a piece of filter media. The cages are contained in a rack that holds a plurality of cages either single or double sided. An automatic water system introduces water into the cage for the rodent using lixits or water valves located either outside or inside the cage. It must be monitored for proper water pressure and must be flushed periodically. Problems of leakage, high intracage humidity levels and cage flooding are associated with automatic watering systems. Airflow is introduced into the cage either positive or negative pressure in an attempt to rid the cage of harmful contaminants, mainly ammonia and CO2. A plenum, either a separate duct system or made up of components of the rack (i.e. the shelves or the tubing uprights), supply the cage with filtered air through a cage mounted or detached air supply diffuser. Air flow in present designs is either transversely across the cage from the front or rear wall, or, from an inlet in the top of the cage to an outlet in the junction of the top of the cage.

The applicant is aware of the following U.S. patents which are related to cages for laboratory animals:

Fricke U.S. Pat. No. 2,467,525; Fuller et al U.S. Pat. No. 3,063,413; Barney U.S. Pat. No. 3,397,676; Holinan U.S. Pat. No. 3,924,571; Gland et al U.S. Pat. No. 4,085,705; Gass U.S. Pat. No. 4,154,196; Nace 4,201,153; Thomas U.S. Pat. No. 4,402,280; Picard et al U.S. Pat. No. 4,435,194; Sedlacek U.S. Pat. No. 4,480,587; LoMaglio 4,526,133; Spengler 4,528,941; Peters et al 4,798,171; Niki 4,844,018; Spina U.S. Pat. No. 4,869,206; Niki et al U.S. Pat. No. 4,940,017; Sheaffer U.S. Pat. No. 4,989,545; Niki et al U.S. Pat. No. 5,003,022; Niki et al U.S. Pat. No. 5,048,453; Coiro, Sr. et al; U.S. Pat. No. 5,148,766; Coiro, Sr. et al U.S. Pat. No. 5,307,757; Sheaffer et al U.S. Pat. No. 5,311,836; Harr Re 32,113; Semenuk D 351,259; Semenuk D 383,253

Current ventilated caging systems, of which the applicant is aware, for laboratory animal care and use in biomedical research/testing is suboptimal because of the lack of the ability to actually dry the bedding which is the root cause of ammonia gas formation. Present units require 60 or more air changes per hour and have been shown to be ineffective in removing all traces of contaminants. Even small concentrations of ammonia have been shown to cause lesions in the respiratory tracts of mice. In addition, mice are burrowing animals and this behavior leads to prolonged periods with their nasal passages in or very near the bedding which is where the harmful ammonia vapor is forming, and they are burrowing in bedding that can be moisture laden from urination and a leaking water source. Bedding has been deemed as a necessary enrichment for rodents. Present day systems do not address the moisture removal from bedding. Their only attempt to dry the bedding is reduce the cage humidity level by high air change rates in the cage. Due to the high intra-cage ventilation rates required with existing ventilated racks, animal losses can occur due to chilling and dehydration of neonates, hairless and nude strains. While the systems currently in use may provide some biological exclusion, the inability to dry the bedding material, contributes to a lack of animal comfort, and requires an enormous amount of conditioned laboratory air every hour. Filtering air through the bedding attacks the source of ammonia formation whereas other systems only treat the symptoms. By attacking the contamination source, lower amounts of air are required to ventilate the cage effectively. This results in reduced HVAC costs and lower mechanical, electrical and plumbing costs during renovations or new construction due to the smaller system requirements.

In present systems, bedding and nesting materials are placed directly on the floor of the solid-bottom cages, since rodents are nesting and burrowing animals. The primary requirements of bedding materials are: (1) the material must not be harmful to the animal; (2) it must be capable of absorbing moisture without causing dehydration of newborn animals, (3) it must not create excessive dust, (4) it must be economical to use and dispose of. Modern bedding materials are absorbent, but, the fact that the bedding is absorbing moisture allows the formation of urease bacteria which then produces ammonia. A major goal is to direct airflow in the cage in such a manner that it keeps the bedding dry, eliminating the formation of the urease bacteria, thus, creating a better cage environment. Since the harmful contaminants are kept from forming, airflow requirements can be reduced, drastically reducing energy requirements in the lab. Reduced airflow in the cage will also reduce aerosols from bedding dust which reduces the clogging of the cage outlet filter. When cages are operated in a negative pressure for bio-containment purposes, the clogging of the outlet filter could cause the cage to revert to a positive pressure environment which could release cage air into the room. Dry bedding is more easily removed from the cage during change-out periods than wet bedding which can adhere to the cage, making removal difficult and time consuming. Reduced airflow results in lower intra-cage sound levels which could result in less stress on the animal and encourage a more optimum breeding environment. Thus, there is a need for a laboratory animal cage and a system of cages which solve these problems.

BRIEF SUMMARY OF THE INVENTION

It is an object of the invention to provide a cage for laboratory animal care which has a laminar air flow from bottom to top to permit a healthy environment.

It is still another object of the present invention to provide a cage for laboratory animal care which can exhaust excess water automatically preventing cage flooding.

It is yet another object of the present invention to provide a system of cages in a rack in which the air flow through each individual cage is controlled, adjustable by the user and there is no cross contamination between the cages.

It is still a further object of the present invention to provide a cage for laboratory animal care to permit optimal animal housing flexibility, protect animal and occupational health by providing a barrier at cage level for exclusion, containment or both, validate data reproducibility; and provide for optimal animal comfort and well-being. It will provide a natural environment promote rapid waste desiccation, eliminate waste contaminant's harmful by-products, save husbandry-related costs, and convey a positive image to the public.

In accordance with the teaching of the present invention there is disclosed an animal cage for laboratory purposes. The cage has a solid floor bottom with a means to suspend a panel, provided with a plurality of perforations formed therein, the perforations to be small enough to allow air to pass through but not allow bedding to fall through above the solid cage floor In further accordance with the teachings of the present invention, there is disclosed a cage for laboratory animal care. The cage has a body having four walls and a solid floor with another removable perforated floor suspended above the cage floor which defines the living space for the animal. A lid is removably connected to the body. There is provided means for circulating clean air through the cage. The cage is air tight. In at least some embodiments, the cage is air permeable.

Also, there is disclosed a cage for laboratory animal care. The cage has a body having four walls and a solid floor with another removable perforated floor suspended above the cage floor which defines the living space for the animal. A lid is removably connected to the body. An air outlet port is formed in the lid. An air inlet port is formed in one of the walls of the body beneath the suspended floor. Means are provided to circulate air between the air inlet port and the air outlet port.

Additionally, there is disclosed a cage for laboratory animal care. The cage has a body having four walls and a solid floor with another removable perforated floor suspended above the cage floor which defines the living space for the animal. A cage wall has an air inlet port formed between the cage floor and the suspended floor. A lid is removably connected to the body, the lid having an air outlet port formed therein. A clean air supply is connected to the air inlet port wherein the clean air flows through the air inlet port, into the space between the cage floor and suspended floor, the clean air flowing laminarly upwardly through the living space for the animal, through the perforated bedded floor, and out the air outlet port. The air flow removes from the cage, particulate matter, allergens and gases associated with waste products.

In another aspect, there is disclosed a ventilated cage system for laboratory animal care having at least one cage having a body. The body has a top and a removable suspended perforated floor. A separate lid is connected to the top, an air outlet port being formed in the lid, wherein each cage is air tight. An air inlet port is formed in the wall of the cage body below the suspended floor with bedding. A rack is provided for supporting at least one cage. An air supply introduces air into the air inlet port in the body. The air flows laminarly from the removable perforated suspended floor with bedding of each cage, through each cage, and through the air outlet port of each lid. In this manner, fresh air is maintained in at least one cage and waste air is removed from at least one cage.

In still another aspect there is disclosed a cage system for laboratory animal care including at least one cage having a body having a top, four side walls and a removable perforated suspended floor. A lid is removably connected to the top of the body. A rack and means for supporting the at least one cage on the rack is provided.

These and other objects of the present invention will become apparent from a reading of the following specification taken in conjunction with the enclosed drawings.

BRIEF DESCRIPTION OF THE DRAWINGS

FIG. 14 is a partial cross-section end view showing the cage supported on the rack with the lid on.

FIG. 15 is an end view showing the cage supported from the rack with the lid on.

FIG. 16 is an end view showing the cage supported on the rack with the lid off.

DESCRIPTION OF THE PREFERRED EMBODIMENTS

Figure 1:
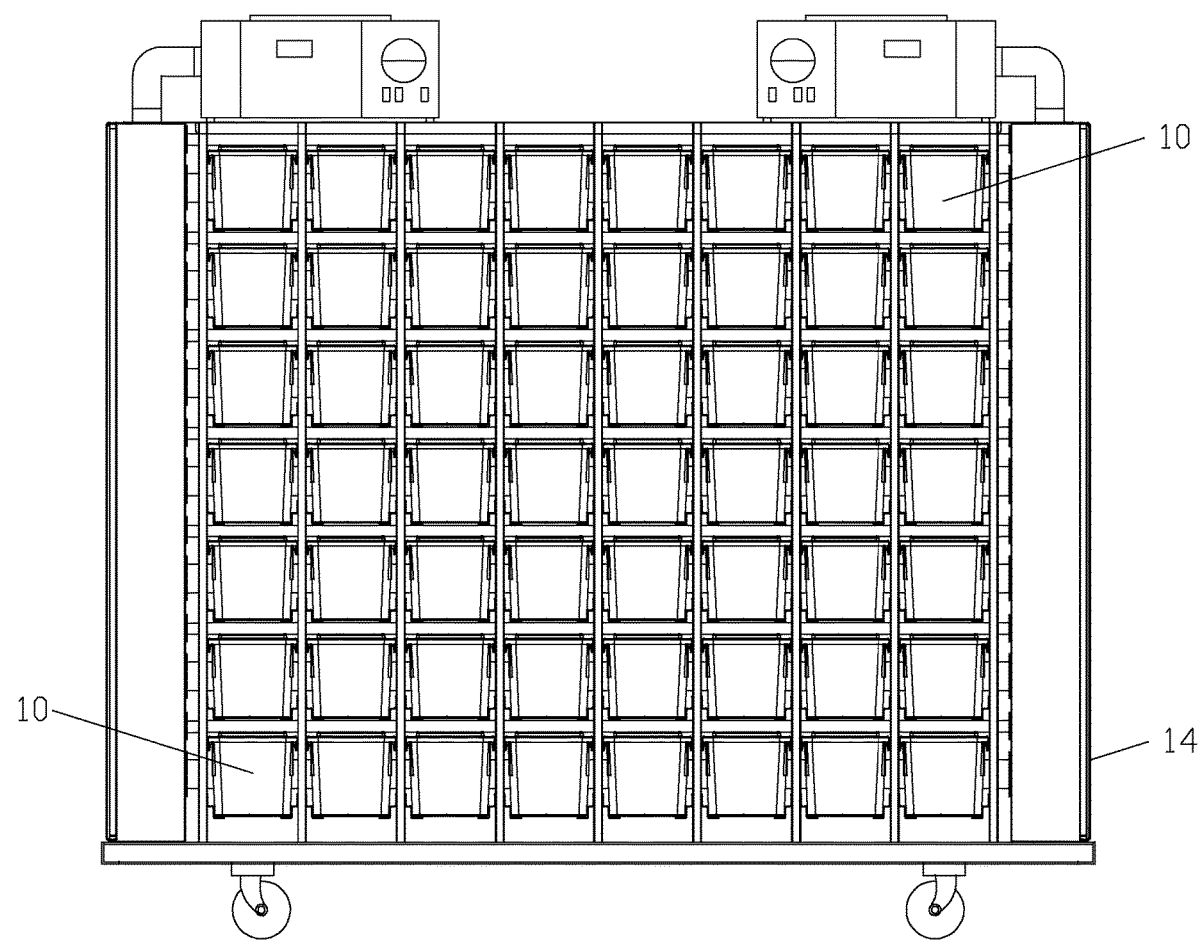
FIG. 1 is a front elevation view of a rack in which are mounted a plurality of cages for laboratory animal care of the present invention.

Referring now to FIGS. 1-5, a plurality of cages 10 are supported on a rack 12. Preferably, the rack 12 is a frame mounted on wheels with a plurality of cage suspension brackets having one or more cages 10 on each bracket.

Each cage 10 is individually connected to an air supply 14 which serves all of the cages 10 in the rack 12. A filter 16 is provided in the air supply. The filter may be a HEPA filter and may also include a prefilter. A blower 20 is disposed in the air supply system to move the air through the cages 10 and the filter 16. The filtered air enters a manifold 18 which is connected by hoses to the individual cages 10. The filter system removes particulate matter and pathogens larger than 0.003 microns in size.

Each cage 10 has a body 22 having four walls and a bottom surface 24 and a removable suspended perforated floor 25 with bedding 19 on top to define a living space for the laboratory animals. A separate lid 26 is removably connected to the top of each body 22. An air outlet port 28 is formed in each lid 26. An exhaust prefilter 36 can be inserted between the lid 26 and a filter retainer 37. The lid rest on a feeder plate 32 which has a plurality of spaced-apart orifices 30 formed therein. Preferably, the orifices are distributed over the entire area of the feeder plate 32.

It is preferred that all corners and the intersections of walls and bottom surface of the cage be rounded to reduce the accumulation of dirt and waste and to facilitate cleaning of the cage. It is preferred that the body of the cage be made of high temperature plastic and that the cage be transparent to permit observation of the animal within the cage.

It is preferred that a feeder plate 32 be disposed between the lid 26 and the body 22 of each cage 10. The feeder plate 32 may be a frame structure which has an angled portion 34 which extends downwardly into the living space of the animal within the body 22 of the cage. The angled portion 34 may have a "V" shape. The feeder plate may be metal or plastic. The feeder plate 32 supports containers of food, water and/or special liquid supplements 38 for the animal. The perforated feeder plate 32 also optimally acts as an air diffuser creating a plenum when coupled with the lid 26.

Figure 8:
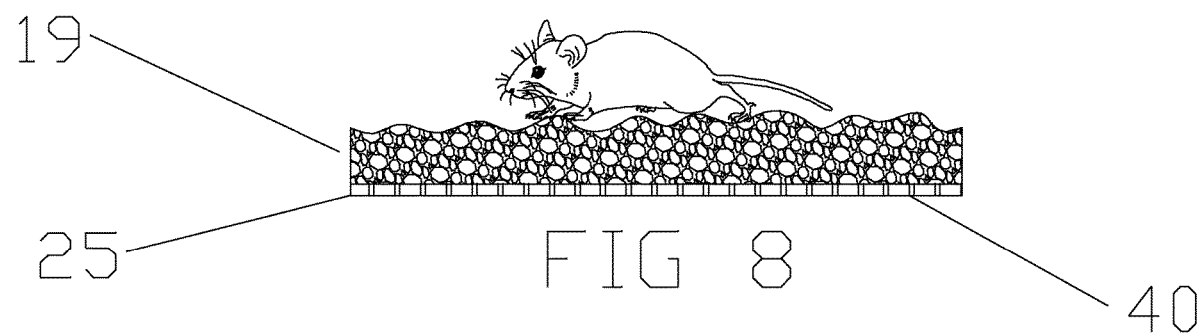
FIG. 8 is a cross-section view of a portion of the removable suspended perforated floor with bedding, along the lines 8-8 of FIG. 7 showing an animal in the cage.
Figure 7:
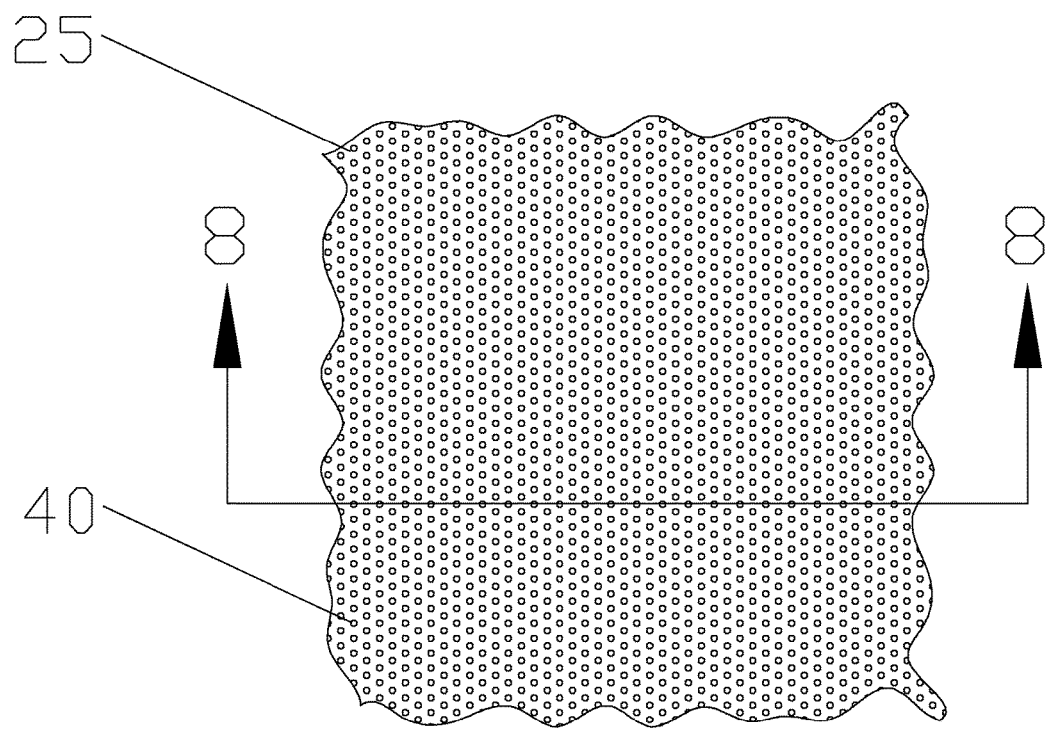
FIG. 7 is a top plan view of a portion of the removable suspended perforated floor.

The body surface (or floor) 24 of the cage 22 is solid. The removable suspended floor 25 is formed having a plurality of spaced-apart perforations 40 (FIGS. 7 and 8). Although not limited to these sizes, it has been found that a satisfactory floor has holes which are approximately 0.055 inches in diameter and suspended approximately ¾ inch in height above the surface of the cage floor. Air, liquids and liquid waste from the animal passes through the perforations 40 into the cage body.

Figure 6:
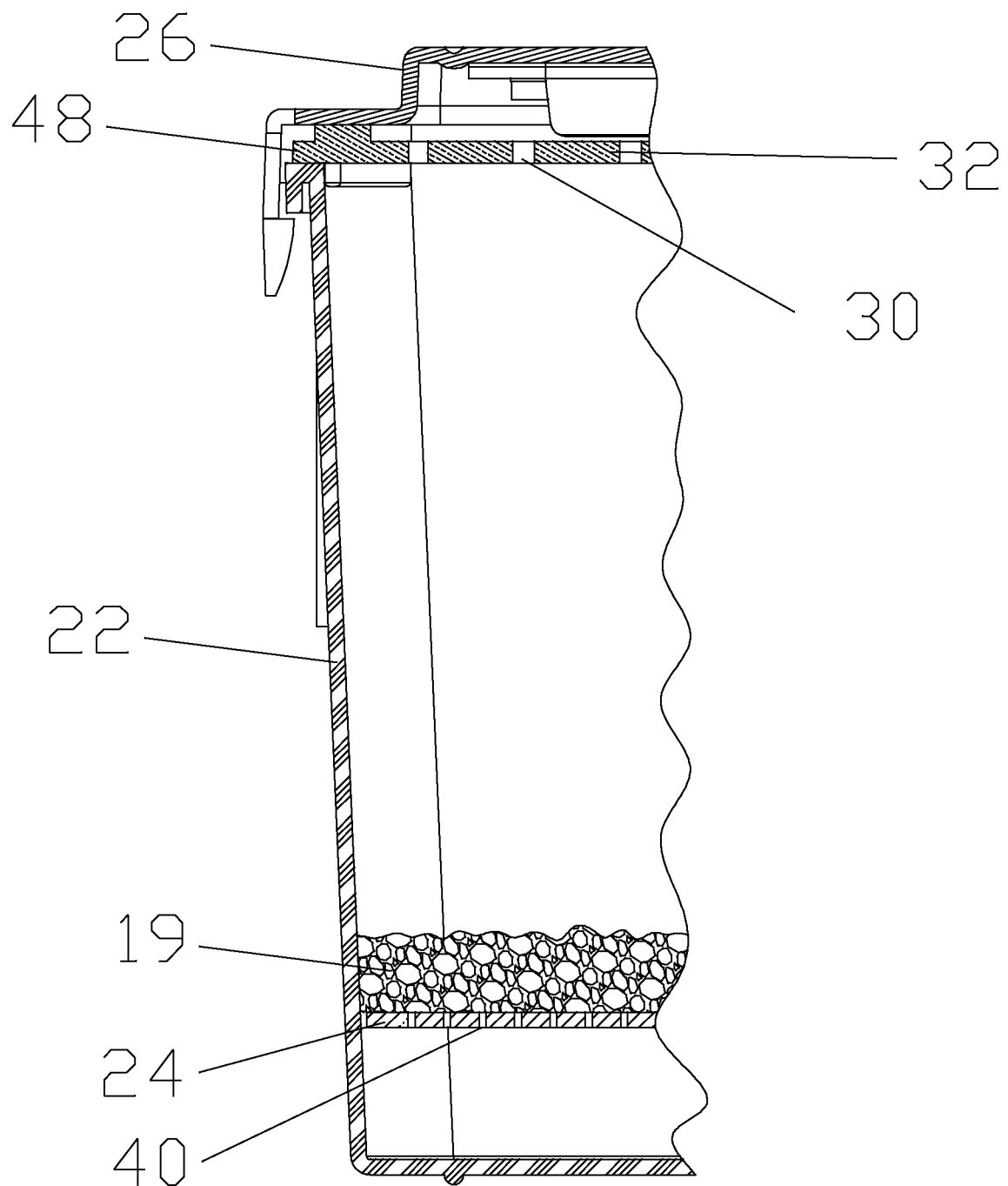
FIG. 6 is a partial cross section view of the cage showing the sealant means.

Preferably, a gasket 48 is fitted between the body 22 of the cage 10 and lid and the body 22 of the cage 10 (FIG. 6). The lid 26 is attached onto the cage 10 and is easily installed and removed by applying pressure on the lid 26 to snap on and off over the gasket 48. In this manner the lid 26 can be easily replaced with a clean lid saving costly man hours. The gasket 48 may be any sealable closure between the body 22 and the lid 26. By use of similar sealing techniques known to persons skilled in the art, each cage system is air tight and the air flow within each cage is restricted to the specific cage. There is no leakage of air from any cage into the room in which the cage is housed nor is there any air interchange between any cages. Cage to cage contamination is prevented.

Figure 2:
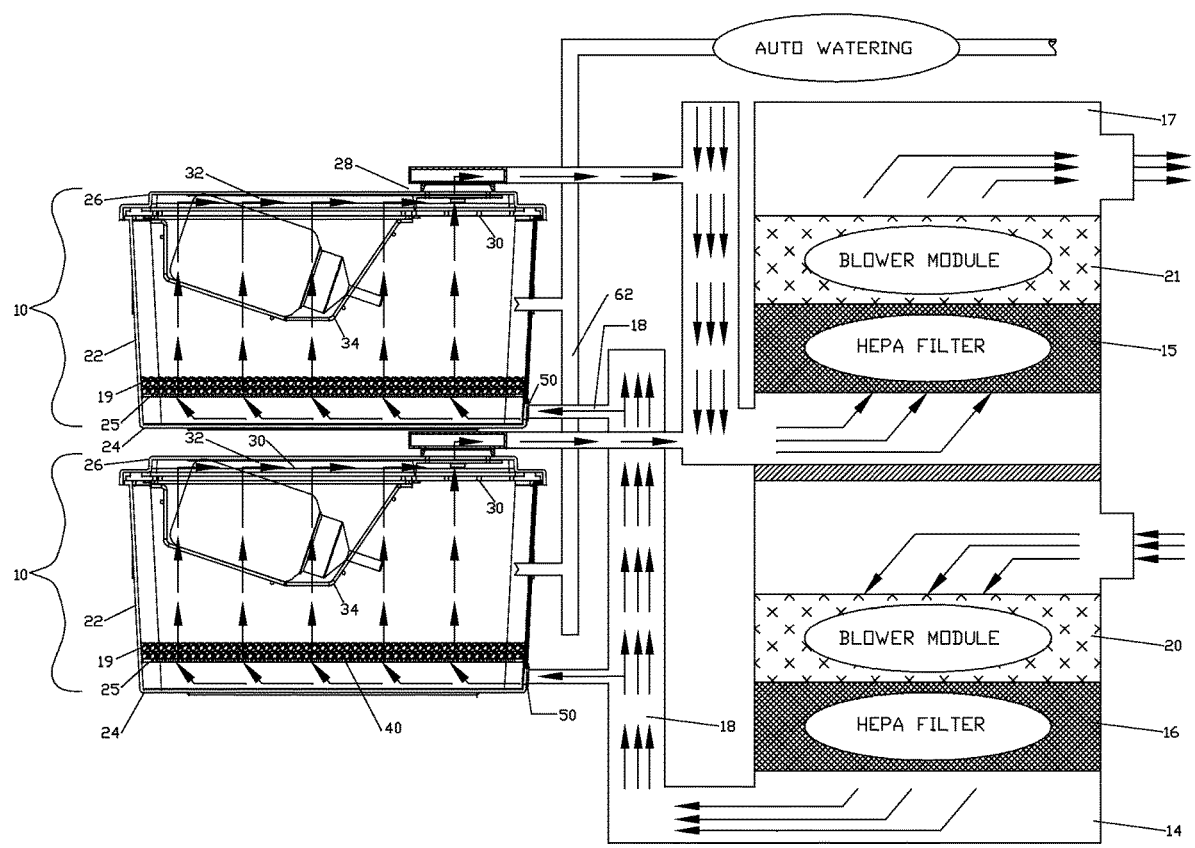
FIG. 2 is a side elevation view of two cages mounted vertically and connected to the air supply and exhaust system.
Figure 3:
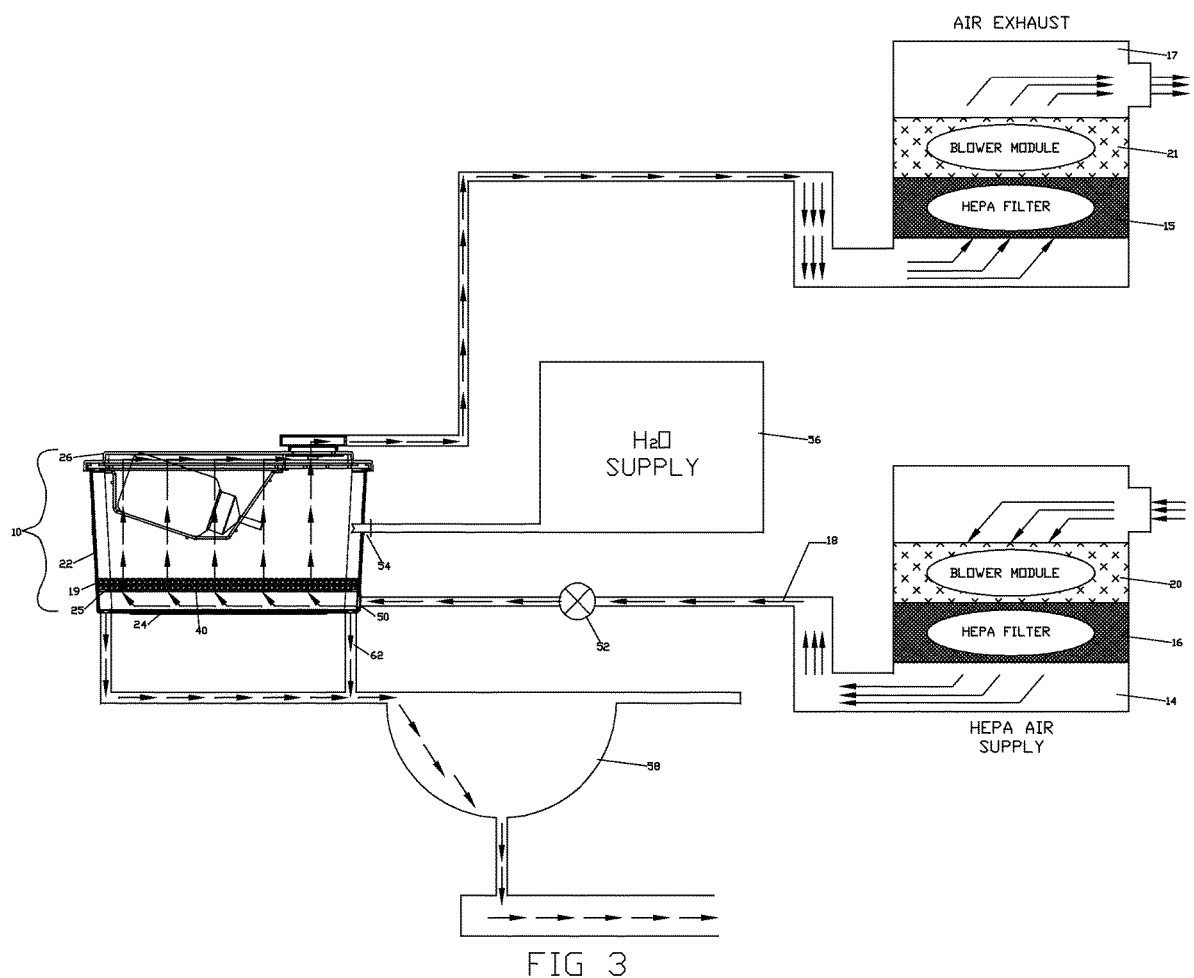
FIG. 3 is a schematic diagram of the ventilated cage system of the present invention.
Figure 4:
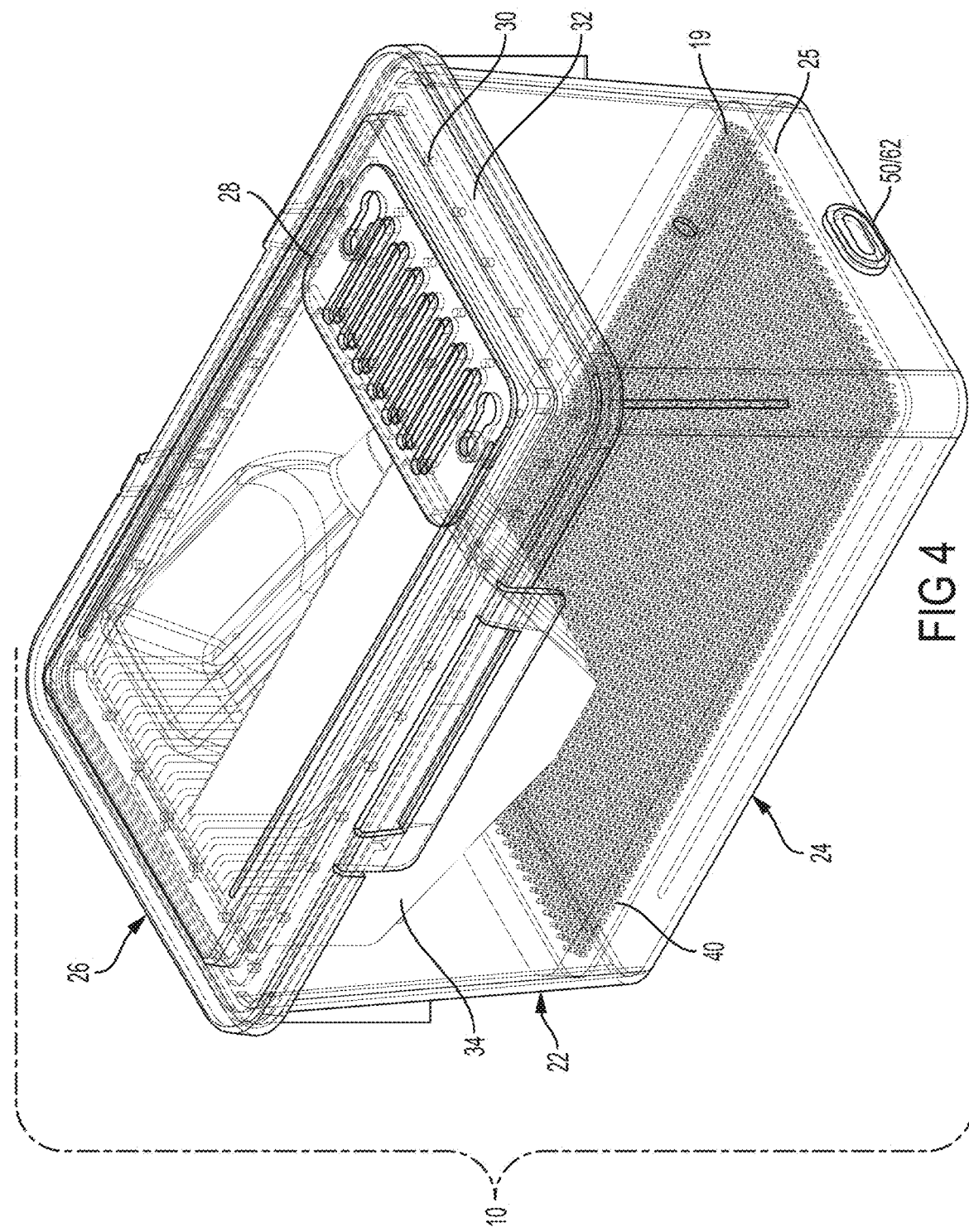
FIG. 4 is a perspective view of the cage.
Figure 5:
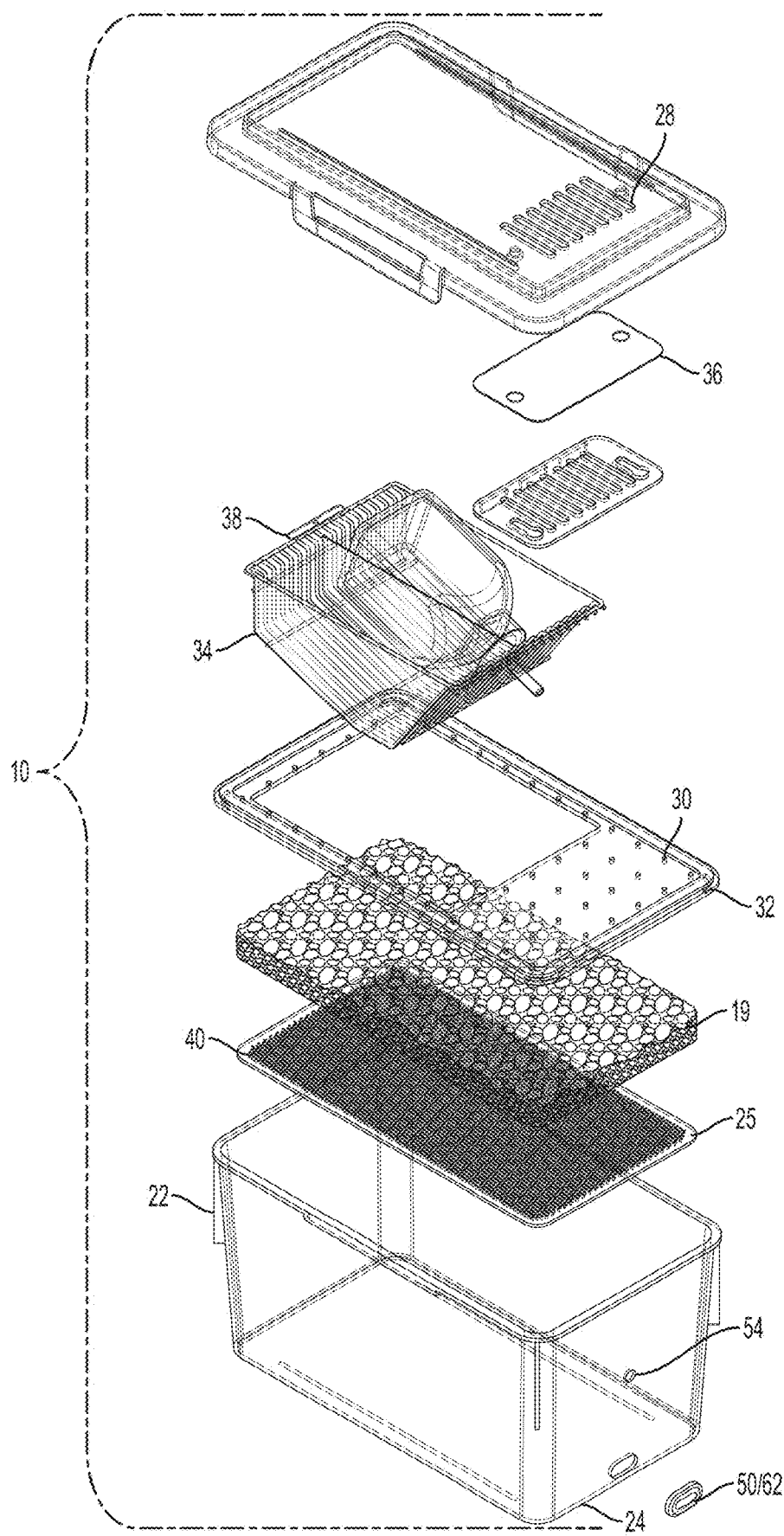
FIG. 5 is an exploded view of the cage.

The cage body 22 has an inlet port 50 formed therein through which the air entering the cage 10, may flow. Also, water or liquid waste products from the animal may exit from the inlet port 50 or alternately another port 62. The waste air, after flowing out of the outlet port 28 is directed preferably through a hose, to the exhaust filter 15 and the particulates and toxic gases are removed by a blower module 21. Air is then resupplied through the inlet filter 16 to the cage system. An adjustable blower 52 in the air supply system is used to control the rate of air flow as needed depending upon the desired conditions and the strain of animal within the cage. Due to the configuration of the cage system and the perforated feeder plate 32 and raised perforated floor 25 with bedding 19 on top of the individual cage, the air flow through each cage is laminar from the bottom of the cage, through the bedding 19, to the top of the cage (FIGS. 2 and 3). In this manner, the animal and bedding 19 is continuously provided with fresh air. The air, after passing through the body 22 of the cage 10, through the raised floor with bedding dries any waste products which may be in bedding 19 or on the floor 24 of the cage 22 and removes or prevents ammonia and other vapors in the system.

A water valve 54 is fitted into the body 22 of the cage 10 and is connected to a water supply 56. The water valve 54 may be manually or automatically controlled to supply the animal with water. The removable suspended perforated floor 25 of the cage and the inlet port 50 of the cage body 22 or other outlet port 62 permit the water to drain from the cage and prevent flooding. The excess water flows to a reservoir 58 and to a drain to be removed from the system.

The cages 10 may be made in a variety of sizes to accommodate laboratory animals of varying sizes.

The intracage airflow system serves as an effective barrier system by preventing the transmission of contaminated particulates and aerosols from cage-to-cage and rack-to-rack. The system uses airflow to prevent or control airborne infection of laboratory animals. The flow of air sweeps the bedding free of gases, particulate matter, allergens and removes them through the filtered outlet port in the lid, keeping the cage environment cleaner than other filtered air cage designs. The HEPA filter (both supply and exhaust) is connected to a baffling system which reduces turbulence and directs the airflow into a distribution plate. This plate houses the connections for the flexible tubing that act as a plenum and either delivers or exhausts air from each cage. Preferably, each tube is of equal length thus supplying or exhausting each cage the same no matter where it is located on the rack. Each tube is housed in a hollow shelf and preferably terminated at the cage with a stainless steel nipple. The air flow to each individual cage is automatically balanced to provide approximately the same air flow into each cage in the system. This may be accomplished by controlling the lengths of the tubing, baffles, varying duct size and other means known to persons skilled in the art.

Figure 9:
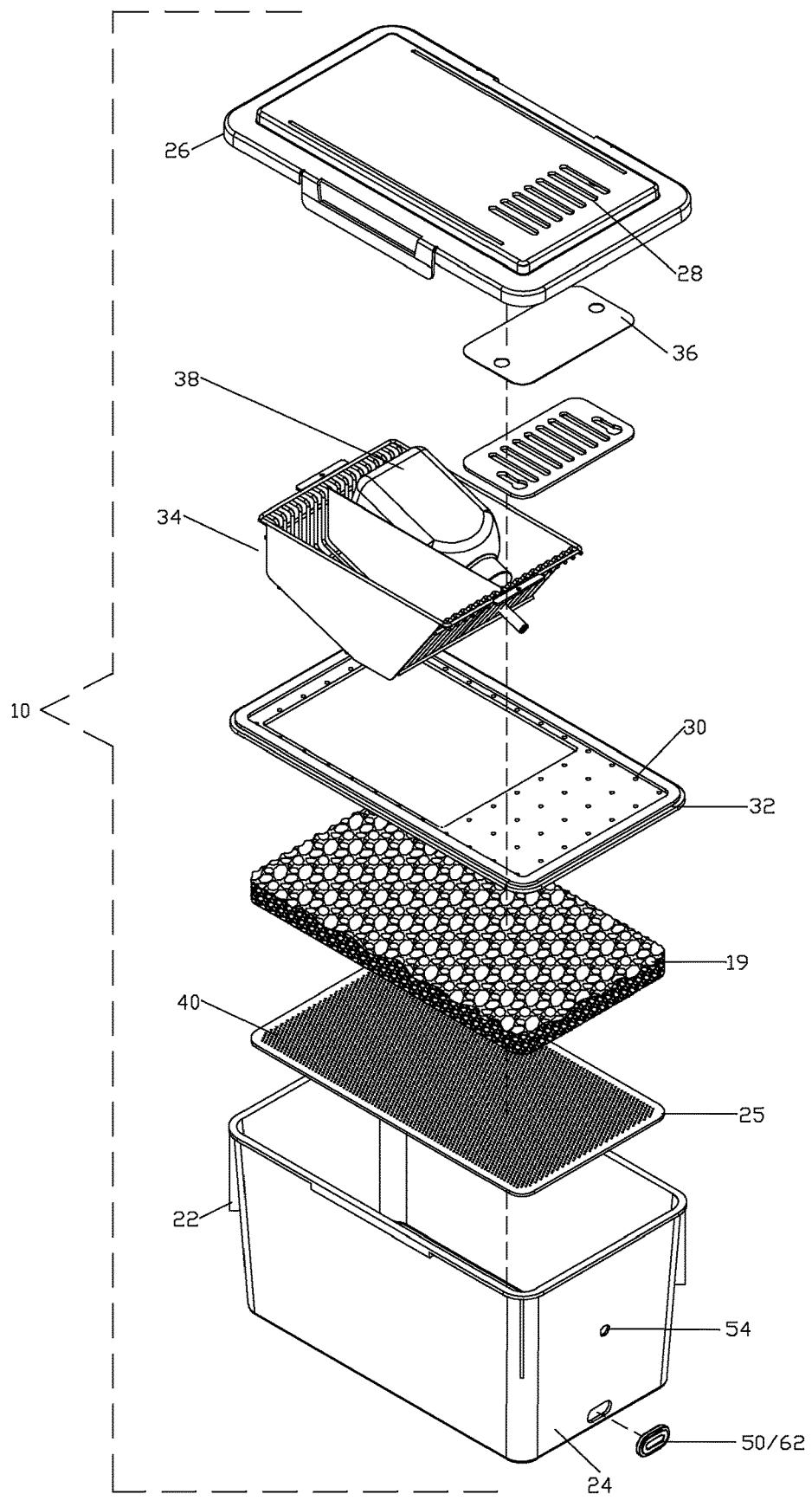
FIG. 9 is a perspective exploded view of a cage as viewed from the top.
Figure 10:
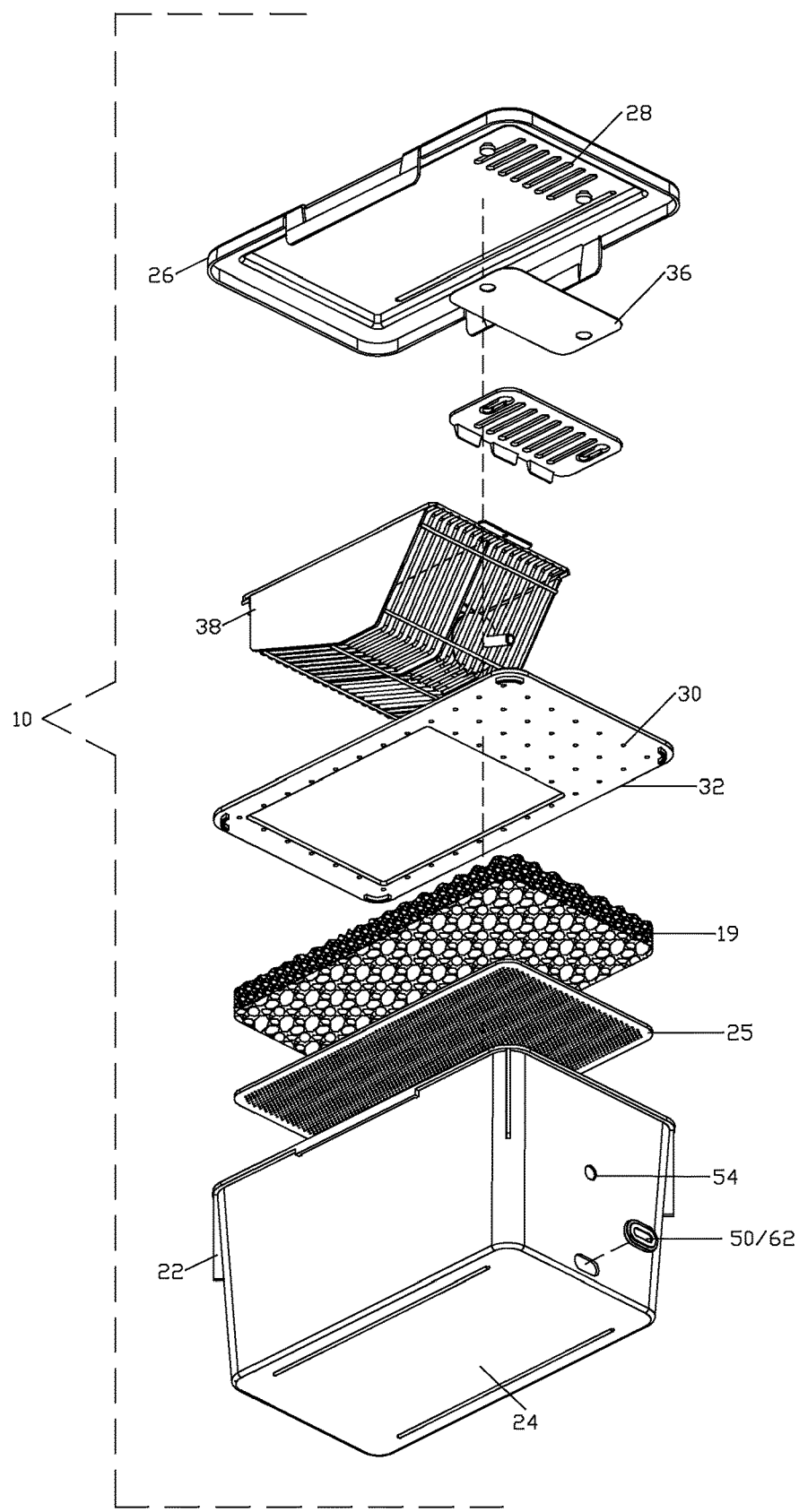
FIG. 10 is the embodiment of FIG. 9 viewed from the bottom.

FIGS. 9 and 10 show another embodiment of the cage 10. The body 22 has four walls and a removable suspended perforated floor 25 with bedding 19 on top, to define the living space for the laboratory animal. A lid 26 is removably connected to the top of the body 22 and. An air outlet 28 is formed in the lid and an air inlet 50 is formed in the body of the cage below the raised suspended floor. Preferably, the surface of the feeder plate 32 has a plurality of spaced-apart orifices 30 formed therein to facilitate laminar flow of the air through the cage 10. A water valve 54 is formed in one of the walls of the body 22. The cage 10, preferably is formed of a transparent plastic. Thus, the embodiment of FIGS. 9 and 10 is very similar to the embodiment of FIGS. 4 and 5. However, the feeder preferably is omitted from the embodiments of FIGS. 4 and 5, although it could be included. The lid 26 has handles 60 formed thereon to assist in removing and attaching the lid 26 from the body 22. Also, the air inlet in the body will function as a water overflow outlet 62 to drain water and liquid waste from the cage body (FIG. 9). It is preferred that the water overflow outlet operate automatically so that there is very little accumulation of liquid in the cage body.

Figure 12:
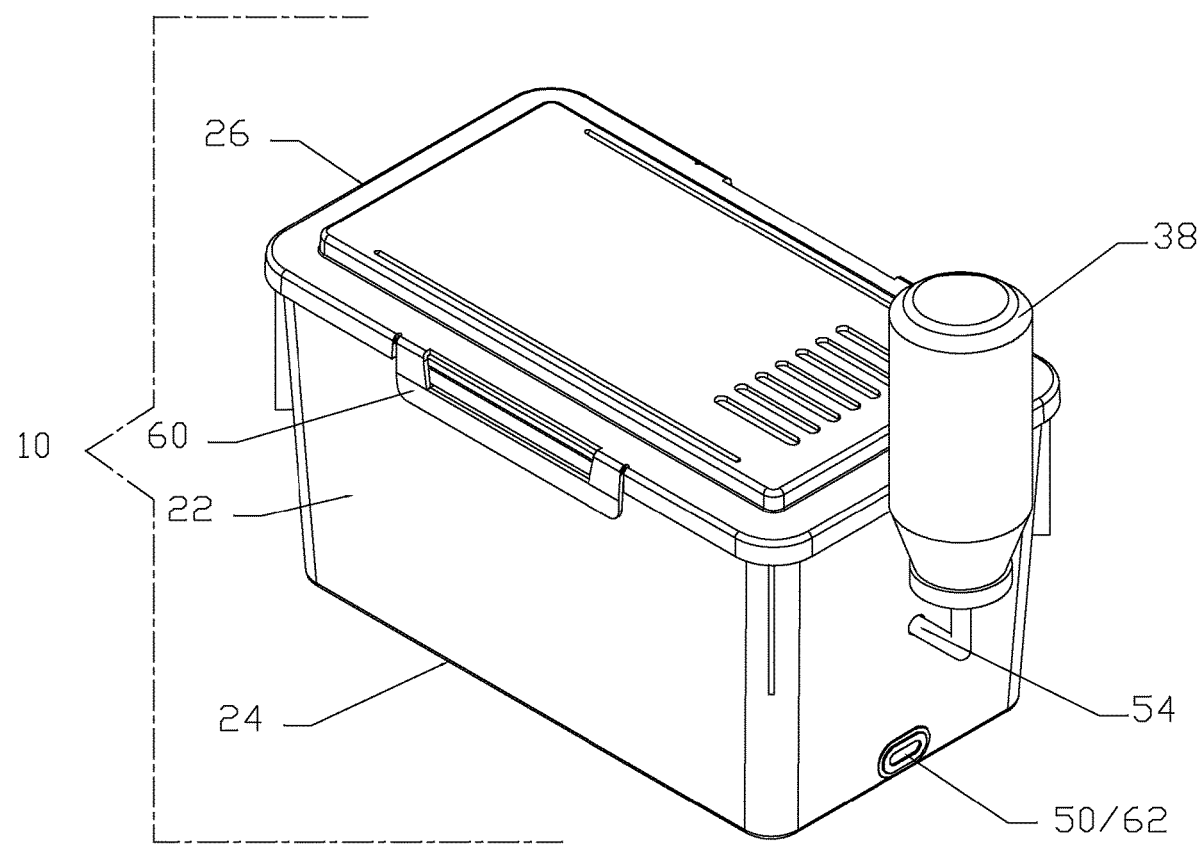
FIG. 12 is a perspective view of the cage with a water bottle attached externally.

As previously described, the cage 10 has a source of water 56 connected to the water valve 54 to provide automatic water feed to the laboratory animal. As shown in FIG. 12, a water bottle 38 may be connected to the water valve 54 where the water bottle 38 is external to the cage 10. This arrangement permits the water to be replenished when necessary without opening the cage 10. Each cage 10 may be disposed in the rack 12 with the respective water valve 54 directed outwardly from the rack 12 such that each externally connected water bottle 38 is readily accessible to an attendant. This construction is especially useful for situations where special diets or additives in the water are provided to the laboratory animals and the water bottles are easily and rapidly accessible.

The cages 10 of the present invention may be supported in the rack 12 in several ways (FIGS. 14-16). The cage body 22 with the lid 26 attached, is supported by a shelf 68 beneath the cage 10, without contacting the shelf 66 above the cage 10 (FIG. 14). Alternately, (FIG. 15) the cage body 22 with the lid 26 may be attached to a shelf 66 of the rack using tracks, clips or other means known to persons having ordinary skill in the art. In yet another configuration, the lid 26 is removed and the top of the body 22 may be attached to a shelf 66 of the rack using tracks, clips or other means known to persons having ordinary skill in the art.

Devices may be secured (snap-on) to the removable suspended perforated floor. These devices are made from appropriate non-toxic material that favors isolation, nest building and thigmotactic behaviors, as well as providing protective or escape mechanisms for submissive animals. The airflow flowing through the bedding prevents the formation of harmful contaminants thus reducing the need for higher airflows in other designs which are addressing the symptoms and not the cause of the formation of contaminants, saving considerable costs on HVAC and larger mechanical systems. Additionally, the elimination of bedding results in considerable cost savings. A central HEPA filtering unit may be mounted on each rack, room mounted to supply several racks or centrally located in a facility to supply many rooms with racks. These systems are all equipped with visual and audible alarms and monitors to alert facility personnel of problems or failures of air flow, temperature, humidity, water leakage, or filters. A battery-operated power supply system can be provided in the event of a power failure.

In summary, one or more embodiments of the cage system of the present invention provides one or more of the following unique features:
bedding free cage uses a perforated floor
a plenum lid
the lid has spaced-apart orifices for air flow
an adjustable blower to vary the air supply and exhaust
unit can accommodate various animal strains by user adjusted airflow
separates air and water from the exhaust (prevents cage flooding)
air is supplied into the bottom of the cage beneath the suspended perforated floor and removed at the top. Air flow direction is laminarly upward.
closed system maintains an approximately neutral pressure in the cage
closed system maintains either positive, negative or neutral pressure in the cage
airflow is delivered and exhausted via a unique distribution system which automatically balances the airflow in each cage
maintains and monitors temperature and humidity at cage level
maintains and temperature and humidity at cage level
snap-on enrichment devices
battery back-up for the HEPA unit
monitors and alarms when problems occur
centralized air supply at room or facility level
sealed cages
a water valve connected to a source of water
a water bottle external to the cage connected to the water valve
water and waste liquid automatically drain from the waste tray
liquid and liquid waste automatically drain from the cage body
alternate means for supporting the cages in the rack.

Obviously, many modifications may be made without departing from the basic spirit of the present invention. Accordingly, it will be appreciated by those skilled in the art that within the scope of the appended claims, the invention may be practiced other than has been specifically described herein.

LIST OF PARTS

10 Cages
12 rack
14 air supply
16 filter
17 Air Exhaust
18 Manifold air supply
19 Bedding
20 Blower air supply
22 Cage Body
24 Bottom of cage
25 Raised floor
26 Lid
28 Air outlet
30 holes in Feeder plate
32 Feeder Plate
34 Wire bar Feeder/Water bottle holder
36 Exhaust Filter
37 Exhaust filter Retainer
38 Water Bottle
40 Holes in Raised Floor
48 Gasket for Lid
50 Air Inlet Port
52 Air Supply Valve
54 Water Valve
56 Water Supply
58 Water Reservoir
60 Handles
62 Water Overflow Outlet
66 Shelf above the cage
68 Shelf beneath the cage

What is claimed is:

1. An animal cage comprising:
a body having four walls, at least one wall of the four walls having an air inlet formed therein;
a first floor at a bottom of the body; and
a second floor above the first floor, above the air inlet, and within the body,
wherein the second floor and the four walls defining a living space above the second floor, above the air inlet, and within the body,
wherein the second floor is at a height above the air inlet,
wherein the second floor includes a set of openings,
wherein the first floor, the second floor, and the four walls form a plenum inside the cage to allow air to flow from the air inlet into the body and to flow laminarly through the set of second floor openings and into the living space, and
wherein the set of second floor openings allow liquids or liquid waste in the living space to substantially fall through the set of second floor openings to the first floor.

2. The animal cage of claim 1, wherein the second floor is a suspended floor and wherein the cage is a ventilated cage and the ventilating air is in communication with the suspended floor.

3. The animal cage of claim 1, wherein the cage has a lid removably connected thereto.

4. The animal cage of claim 1, further comprising a water valve fitted into a wall of the cage.

5. The animal cage of claim 4, wherein a water bottle is connected to the water valve externally of the cage such that water is available within the cage.

6. The animal cage of claim 1, wherein the cage is formed of transparent material.

7. A cage for laboratory animal care, the cage comprising:
a body having four walls and a bottom;
a removable suspended perforated floor configured to support bedding and thereby define a living space for the animal;
an air inlet port formed in the body and below the suspended floor;
a lid removably connected to the body, the lid having an air outlet port formed therein; and
a clean air supply connected to the air inlet port, wherein the cage is configured such that clean air is able to flow through the air inlet port into the body, the clean air is able to flow laminarly upward through the suspended perforated floor, through the living space for the animal, into the lid and out the air outlet port, the air flow is able to remove from the cage, particulate matter, allergens and/or gases associated with waste products.

8. The cage of claim 7, further comprising a water valve formed in one of the walls of the cage, the water valve being configured to provide water to the laboratory animal.

9. The cage of claim 8, wherein a water bottle is connected to the water valve externally of the cage.

10. The cage of claim 7, further comprising a water overflow outlet formed in the bottom of the cage body, wherein liquid waste and water are drained from the cage.

11. The cage of claim 7, wherein the cage is configured to be mounted in a rack for supporting the cage.

12. The cage of claim 7, wherein the cage is formed of a transparent material.

13. A ventilated cage system for laboratory animal care comprising:
a cage comprising:
a body having a top and a bottom;
a separate lid connected to the top, an air outlet port being formed in the lid;
a removable perforated floor suspended above the bottom; and
an air inlet port formed in the cage body below the suspended floor;
a rack for supporting the cage; and
an air supply introducing air into the air inlet port in the body, the air flowing laminarly through the suspended floor, through the cage, through the lid of the cage, and through the air outlet port of the lid wherein fresh air is maintained in the cage and waste air is removed from the cage.

14. The cage system of claim 13, the lid having a bottom surface, the bottom surface having a plurality of orifices formed therein wherein the air flow through the cage is uniformly distributed.

15. The cage system of claim 13, wherein the lid is removed and the top of the body is attached to an underside of the rack.

16. The cage system of claim 13, wherein the lid is removed and the bottom of the body is supported by the rack.

17. The cage system of claim 13, wherein the lid is removed and the sides of the body are attached to the rack.

18. The cage system of claim 16, wherein the body is detached from the lid and the lid is attached to an underside of the rack spaced apart from, and above the body.

19. The cage system of claim 13, further comprising a water valve fitted into a wall of the cage.

20. The cage system of claim 19, wherein a water bottle is connected to the water valve externally of the cage such that water is available within the cage.

* * * * *